Dec. 30, 1958
P. S. SAUNDERS
2,866,335
FLUID INCIDENCE DETECTOR
Filed May 24, 1955
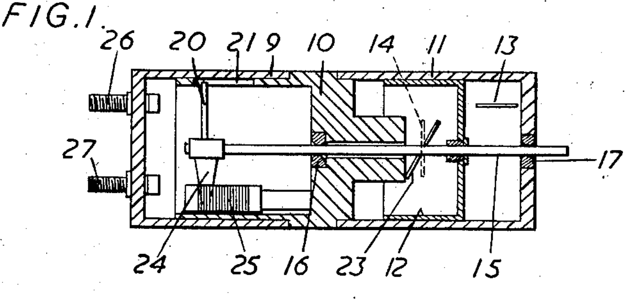
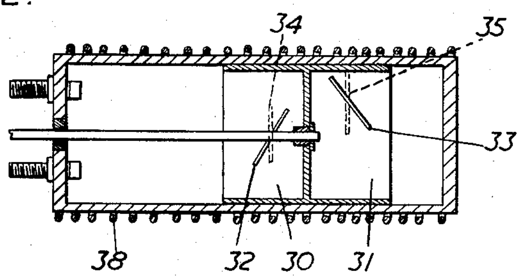
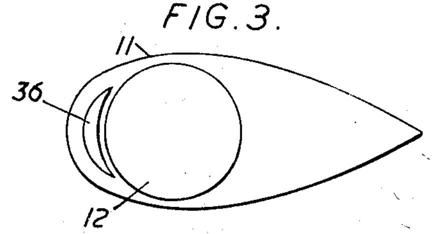
Inventor
PETER SIDNEY SAUNDERS
By Moore & Hall
Attorneys United States Patent Office 2,866,335

Patented Dec. 30, 1958

2,866,335

FLUID INCIDENCE DETECTOR

Peter Sidney Saunders, Hillington, Glasgow, Scotland, assignor to Kelvin & Hughes Limited, Glasgow, Scotland Application May 24, 1955, Serial No. 510,651

Claims priority, application Great Britain May 25, 1954

11 Claims. (Cl. 73—188)

The invention relates to aerodynamic and like instruments of the kind which are used for detecting the incidence of a fluid stream.

It is well known that a pressure variation exists over the surface of a cylinder exposed to fluid flow normal to its axis and that with a circular cylinder, the bisector of the angle between two points at equal pressures gives the direction of fluid flow. The position obtained by rotating the cylinder about its axis so that two holes in its surface have identical pressures will define the direction of flow. Similarly, if the position of one hole is fixed and that of the other variable, the position of the variable hole for equal pressures will give the direction of flow.

It is the object of this invention to provide an improved fluid incidence detector having a minimum of moving parts.

It is a further object of the invention to provide an improved fluid incidence detector in which the moving part is not exposed to the fluid stream.

According to this invention, an improved fluid incidence detector comprises a cylinder having in its surface a hole and a slot, a cylindrical piston moving axially within said cylinder, in that section of the cylinder beyond said hole, said piston having a slot, at least one of said slots having components of direction both axially and circumferentially so that any difference of pressures on opposite sides of the piston causes axial movement of said piston whereby the position of coincidence between said cylinder slot and said piston slot moves around the circumference of the cylinder until a balance of the pressures on opposite sides of the piston is established.

Constructional forms of the invention will now be described by way of example with reference to the accompanying diagrammatic drawings wherein:

Figure 1 is a sectional view of an air incidence detector instrument made in accordance with the invention;

Figure 2 is a similar view showing a modified construction; and

Figures 3 is a plan view of one form of such an instrument.

Referring first to Figure 1, is a central body 10 is fitted with a first hollow cylinder or cap 11 and a second hollow cylinder or cap 9. The first cylinder has a fixed hole 13 in the form of a slot extending axially of the cylinder in a position in its surface at approximately 45° to the direction of the air stream. A circumferential slot 14 in the cylinder surface is axially and circumferentially displaced from said fixed hole 13, its centre being about 90° to the fixed hole. Within the cylinder 11 a skirted piston 12 is constrained by a piston rod 15 to move axially in two sliding jewel bearings 16, 17, there being a small radial clearance between the piston and the cylinder. The rod 15 extends into the cap 9 and carries an arm 20 that engages in a slot 21 to limit the movement of the piston so that it does not cover the fixed hole 13 or completely uncover the circumferential slot 14. The arm 20 also prevents relative rotary motion between the piston and cylinder. A slot 23 in the piston skirt is shaped with axial and circumferential components of direction and so that the crossing position of it and the circumferential slot 14 traverses the circumferential slot for one complete movement of the piston. An air-tight seal is not required if sufficient resistance to air flow is available. One side of the piston is exposed to pressure through the slot 23 whilst the other side is subjected to pressure through the fixed hole 13. Any difference in these pressures results in movement of the piston to a position in which both sides are subjected to equal pressures.

The rod 15 carries an electrical contact arm 24 which wipes over a potentiometer or an inductance unit 25 with linear transmission, this unit 25 being connected to terminals 26, 27 for connection to an electric control or indicator device.

More than one circumferential slot and/or piston may be provided if desired.

As shown in Figure 2 a double skirted piston 30, 31 is used having two helical slots 32, 33 in the piston skirts, each of which co-operates with a circumferential slot 34, 35 respectively, in the outer cylinder.

The cylinder may have a wound resistance heater 38 for de-icing purposes.

In another embodiment of the invention in which two pistons are employed, the piston rods operate in two sets of bearings thus removing the necessity for the provision of the arm to prevent rotation. Further, in such an embodiment, the transmission system may be conveniently located in the centre at the cylinder between the two piston skirts.

The magnification of such a system can be altered by changing the relative angle of the slots.

Further, as shown in Figure 3, the outer cylinder may be of streamlined form, the piston remaining of circular section.

Conveniently in a fluid incidence detector having its outer surface streamlined in form, the heater for de-icing may be located in the nose portion as shown at 36.

While there have been described above what are at present believed to be the preferred forms of the invention, other forms will suggest themselves to those skilled in the art. All such variations as fall within the true spirit of the invention are intended to be covered by the generic terms of the claims set forth below.

I claim:

1. In combination in a device for detecting the incidence of a fluid stream, comprising a cylinder having in its surface a hole and a slot, said slot being positioned at an angle with respect to the axis of said cylinder, a piston mounted for axial movement within said cylinder, said piston having a skirted portion with a slot therein positioned to intersect said first slot at an angle, a passage formed by the relatively movable walls of both said slots, said passage being movable around the circumference of said cylinder as said piston moves axially within said cylinder, said passage and said hole being displaced from each other circumferentially around said cylinder sufficiently to remain on opposite sides of the axis of incident fluid flow during normal operation of the device, said piston having a wall positioned normally between said hole and said passage whereby a pressure differential may be applied to said piston wall caused by a fluid stream incident upon said cylinder, said piston being movable in response to said pressure differential to produce circumferential movement of said passage around said cylinder to a position in which the said pressure differential is substantially equalized by a balance of pressure on opposite sides of said piston wall and means to indicate movement of said piston.

2. The combination set forth in claim 1, having a wound resistance heater for de-icing.

3. The combination set forth in claim 1, wherein the cylinder is of streamlined shape.

4. The combination set forth in claim 1, both said slots being substantially straight.

5. The combination set forth in claim 1, the circumferential displacement of said passage and said hole being less than pi radians and greater than a half of a radian.

6. The combination set forth in claim 1, the circumferential displacement of said passage and said hole varying about a median value of substantially ninety degrees.

7. The combination set forth in claim 6, said hole being a slot, said piston having a second skirt on the opposite side of said wall from said first skirt and having a slot cooperating with said slotted hole to produce a second removable passage to provide said pressure differential.

8. The combination set forth in claim 1, said piston having a connecting rod slidably mounted in jeweled bearings carried by said cylinder.

9. The combination set forth in claim 8, said rod having contact means cooperating with electrical indicator means.

10. The combination set forth in claim 9, said rod having an arm, guide means carried by said cylinder and receiving said arm to limit axial movement of said piston.

11. An instrument for detecting the incidence of a fluid stream comprising in combination, a cylinder, a cylindrical piston movable axially within said cylinder, at least two openings provided in the cylindrical wall of said cylinder, an opening in said piston, said opening in said piston cooperating with and intersecting one of the openings in said cylinder and providing a through opening passing through both cylinder and piston at the position of intersection of said cooperating openings, said cooperating openings being elongate and having components of position both axial and circumferential, said through opening being circumferentially movable according to axial movements of said piston, said cooperating openings being disposed on one side of said piston and another of said openings in said cylinder being disposed on the other side of said piston whereby any difference of pressures on opposite sides of the piston causes axial movement of said piston so that the position of intersection between said cylinder opening and said piston opening moves around the circumference of the cylinder until a balance of the pressures on opposite sides of the piston is established.

References Cited in the file of this patent

UNITED STATES PATENTS

| | | |
|---|---|---|
| 2,029,700 | Boykow | Feb. 4, 1936 |
| 2,445,746 | Raspet | July 20, 1948 |
| 2,487,414 | Baxter | Nov. 8, 1949 |
| 2,701,473 | Fieldgate | Feb. 8, 1955 |